(12) United States Patent
Wang et al.

(10) Patent No.: US 11,188,729 B2
(45) Date of Patent: Nov. 30, 2021

(54) DISPLAY PANEL, FINGERPRINT IDENTIFICATION DISPLAY MODULE AND FINGERPRINT IDENTIFICATION METHOD

(71) Applicant: BOE TECHNOLOGY GROUP CO., LTD., Beijing (CN)

(72) Inventors: Lei Wang, Beijing (CN); Haisheng Wang, Beijing (CN); Xiaoliang Ding, Beijing (CN); Yingming Liu, Beijing (CN); Yuzhen Guo, Beijing (CN); Changfeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/769,065

(22) PCT Filed: Oct. 25, 2019

(86) PCT No.: PCT/CN2019/113251
§ 371 (c)(1),
(2) Date: Jun. 2, 2020

(87) PCT Pub. No.: WO2020/088360
PCT Pub. Date: May 7, 2020

(65) Prior Publication Data
US 2021/0232791 A1    Jul. 29, 2021

(30) Foreign Application Priority Data

Oct. 30, 2018 (CN) .......................... 201811275268.0

(51) Int. Cl.
*G06K 9/00* (2006.01)
*G09G 3/3208* (2016.01)
*G06F 3/041* (2006.01)

(52) U.S. Cl.
CPC .......... *G06K 9/0004* (2013.01); *G06F 3/0412* (2013.01); *G06F 3/0416* (2013.01); *G09G 3/3208* (2013.01)

(58) Field of Classification Search
CPC ... G06K 9/0004; G06F 3/0416; G06F 3/0412; G09G 3/3208
See application file for complete search history.

(56) References Cited

U.S. PATENT DOCUMENTS

| 2008/0278459 A1 | 11/2008 | Yamashita |
| 2016/0316262 A1 | 10/2016 | Chen |

(Continued)

FOREIGN PATENT DOCUMENTS

| CN | 104239869 A | 12/2014 |
| CN | 104850292 A | 8/2015 |

(Continued)

OTHER PUBLICATIONS

International Search Report dated Feb. 6, 2020, issued in couterpart Application No. PCT/CN2019/113251 (10 pages).

(Continued)

*Primary Examiner* — Premal R Patel
(74) *Attorney, Agent, or Firm* — Westerman, Hattori, Daniels & Adrian, LLP

(57) ABSTRACT

The disclosure relates to a display panel for fingerprint identification. The display panel for fingerprint identification may include a fingerprint identification assembly in a display area of the display panel and a plurality of pixel units. The fingerprint identification assembly may include a plurality of point light sources arranged in an array and a plurality of photosensitive units arranged in an array. The plurality of point light sources may be configured to emit signal light, and the plurality of photosensitive units may be (Continued)

configured to receive the signal light reflected by a finger to identify a fingerprint of the finger.

19 Claims, 14 Drawing Sheets

(56) References Cited

U.S. PATENT DOCUMENTS

| | | | |
|---|---|---|---|
| 2016/0349882 A1 | 12/2016 | Liu et al. | |
| 2017/0371213 A1 | 12/2017 | Wang et al. | |
| 2018/0239942 A1 | 8/2018 | Xu et al. | |
| 2019/0042825 A1* | 2/2019 | He | G06K 9/0004 |
| 2019/0180071 A1* | 6/2019 | Kim | G06K 9/0004 |
| 2019/0213379 A1 | 7/2019 | Zhao et al. | |
| 2019/0237521 A1* | 8/2019 | Ju | H01L 27/323 |

FOREIGN PATENT DOCUMENTS

| | | |
|---|---|---|
| CN | 105139793 A | 12/2015 |
| CN | 106056099 A | 10/2016 |
| CN | 106249457 A | 12/2016 |
| CN | 106326859 A | 1/2017 |
| CN | 106991387 A | 7/2017 |
| CN | 107851103 A | 3/2018 |
| CN | 108288681 A | 7/2018 |
| CN | 108598117 A | 9/2018 |
| CN | 108664895 A | 10/2018 |
| CN | 110163058 A | 8/2019 |

OTHER PUBLICATIONS

Office Action dated Sep. 29, 2020, issued in counterpart CN Application No. 201811275268.0, with English translation (8 pages).
Office Action dated Jun. 3, 2021, issued in counterpart CN application No. 201811275268.0, with English translation. (26 pages).

* cited by examiner

Prior Art

DISPLAY PANEL, FINGERPRINT IDENTIFICATION DISPLAY MODULE AND FINGERPRINT IDENTIFICATION METHOD

CROSS-REFERENCE TO RELATED APPLICATIONS

This application claims benefit of the filing date of Chinese Patent Application No. filed 201811275268.0 on Oct. 30, 2018, the disclosure of which is hereby incorporated in its entirety by reference.

TECHNICAL FIELD

The present disclosure relates to the field of display technologies, and in particular, to a display panel, a fingerprint identification display module and a fingerprint identification method.

BACKGROUND

In the prior art, the fingerprint collection component matched with the display screen on the electronic apparatus is mainly a capacitive fingerprint sensor, and the capacitive sensor is usually disposed outside the display area, for example, integrating in a Home button (start key) of a terminal such as a mobile phone, to achieve fingerprint collection.

BRIEF SUMMARY

An embodiment of the present disclosure provides a display panel for fingerprint identification. The display panel for fingerprint identification may include a fingerprint identification assembly in a display area of the display panel and a plurality of pixel units. The fingerprint identification assembly may include a plurality of point light sources arranged in an array and a plurality of photosensitive units arranged in an array. The plurality of point light sources may be configured to emit signal light, and the plurality of photosensitive units may be configured to receive the signal light reflected by a finger to identify a fingerprint of the finger.

Optionally, the plurality of point light sources are OLEDs, and the plurality of pixel units and the plurality of photosensitive units are arranged in a same layer on a base substrate of the OLED display panel.

Optionally, the plurality of point light sources are external light sources, the plurality of photosensitive units and the plurality of pixel units are arranged on a base substrate of the display panel, and the plurality of point light sources are arranged below the base substrate of the display panel.

Optionally, the plurality of point light sources are micro LED sources or mini LED sources.

Optionally, the plurality of pixel units and the plurality of photosensitive units are arranged alternately in a row direction and/or a column direction.

One embodiment of the present disclosure provides a fingerprint identification display module, comprising: the display panel according to one embodiment of the present disclosure; and a control module; wherein the control module is configured to drive the plurality of pixel units to perform refreshing of a display screen during a first time period of a first display period, and drive the fingerprint identification assembly to perform fingerprint identification operation during a second time period of the first display period during a process of the fingerprint identification operation.

Optionally, the control module is further configured to drive the plurality of pixel units to perform refreshing of a display screen during a second display period when the fingerprint identification operation is not performed; and the second display period is smaller than the first display period.

Optionally, the second display period is equal to the first time period of the first display period.

Optionally, the display area comprises a plurality of detection areas; the plurality of the point light sources and the plurality of the photosensitive units being disposed in each of the detection areas; the display panel further comprises a touch electrode layer in the display area; the control module comprises a control IC, an image processing IC, and a driving IC, wherein the control IC is configured to determine a touch position based on the touch electrode layer; the image processing IC is configured to determine at least one of the detection areas overlapping the touch position according to the touch position; and the driving IC is configured to drive the point light sources in the at least one of the detection areas overlapping the touch position to illuminate and drive the photosensitive units in the at least one of the detection areas overlapping the touch position to receive the signal light reflected by the finger.

Optionally, the fingerprint identification display module further comprises a photosensitive unit control circuit; wherein the photosensitive unit control circuit is configured to, under a control of the control module, turn on the photosensitive units in the at least one of the detection areas overlapping the touch position to identify the fingerprint at the touch position.

Optionally, each of the photosensitive units comprises a photosensitive element configured to receive the signal light reflected by the finger to generate a photocurrent and a first switch unit configured to control an output of the photocurrent generated by the photosensitive element; and the photosensitive unit control circuit comprises a first circuit and a second circuit; the first circuit is connected to control terminals of a plurality of first switch units, and is configured to turn on the first switch units in the at least one of the detection areas overlapping the touch position under the control of the control module, and the second circuit is connected to output terminals of the plurality of first switch units, and is configured to read the photocurrent outputted by the output terminals of the first switch units in the at least one of the detection areas overlapping the touch position under the control of the control module.

Optionally, the display panel further comprises X detection gate lines connecting to the control terminals of each row of the first switch units; and Y data read lines connecting to the output terminals of each column of the first switch units; wherein, the X detection gate lines are divided into m groups, and the Y data read lines are divided into n groups, the number of the detection areas is m*n, and each detection area corresponding to X/m detection gate lines and Y/n data read lines arranged in sequence; wherein X, Y, m, and n are all positive integers greater than 1, and X>m, Y>n.

Optionally, the first circuit comprises m detection gate driving circuits corresponding to the m groups one by one, each of the m detection gate driving circuits is configured to control a plurality of the first switch units in one group to turn on line by line; the second circuit comprises n selection gate lines, Y/n selection transmission lines, and n data selection units corresponding to the n groups one by one; each of the data selection units comprising Y/n second switch units that are in one-to-one correspondence with Y/n data read lines in each group; wherein input terminals of the second switch units are respectively connected to the data read lines, control terminals of the Y/n second switch units in a same data selection unit are all connected to a same selection gate line; and an output terminal of the i-th second switch unit in each of the data selection units is connected to a same selection transmission line, wherein i is an integer from 1 to Y/n.

Optionally, the driving IC is configured to output a control terminal start signal to the detection gate driving circuit, and an input terminal of each of the detection gate driving circuit for receiving the control terminal start signal is independently connected to each gate driving pin of the driving IC; the driving IC is further configured to output a selection start signal to the n selection gate lines; the driving IC is further configured to read the photocurrent transmitted by the selection transmission lines, and each of the selection transmission lines is independently connected to each source driving pin of the driving IC; and the image processing IC is further configured to acquire a fingerprint image based on the photocurrent output by the driving IC.

One embodiment of the present disclosure provides a fingerprint identification method of a fingerprint identification display module, comprising: determining a touch position of a finger touched on a display panel, determining at least one of detection areas of the display panel overlapping the touch position according to the touch position; and turning on point light sources and photosensitive units in a fingerprint identification assembly in the at least one of the detection areas overlapping the touch position to identify a fingerprint of the finger.

Optionally, turning on the photosensitive units in the at least one of the detection areas overlapping the touch position to identify the fingerprint of the finger comprises: opening a plurality of first switch units in the at least one of the detection areas overlapping the touch position; and reading photocurrent outputted by output terminals of the plurality of first switch units in the at least one of the detection areas overlapping the touch position.

Optionally, opening the plurality of the first switch units in the at least one of the detection areas overlapping the touch position comprises outputting a control terminal start signal to a detection gate driving circuit corresponding to the at least one of the detection areas overlapping the touch position, so that to open the plurality of the first switch units in at least one of the detection areas overlapping the touch position.

Optionally, reading the photocurrent output by the output terminals of the plurality of first switch units in the at least one of the detection areas overlapping the touch position, comprises outputting a selection start signal to at least one of selection gate lines, wherein the selection gate lines are connected to control terminals of the second switch units, and the input terminals of the second switch units are connected to the data read lines corresponding to the at least one of the detection areas overlapping the touch position; and reading photocurrent transmitted by the selection transmission lines connected to output terminals of the corresponding second switch units.

Optionally, when performing the fingerprint identification operation, the plurality of pixel units is driven to perform refreshing of a display screen during a first time period of the first display period, and the fingerprint identification assembly is driven to perform the fingerprint identification operation during a second time period of the first display period.

Optionally, when the fingerprint identification operation is not performed, the plurality of pixel units is driven to perform refreshing of a display screen during a second display period; and the second display period is less than the first display period.

BRIEF DESCRIPTION OF THE DRAWINGS

In order to more clearly illustrate the embodiments of the present disclosure or the technical solutions in the prior art, the drawings used in the embodiments or the prior art description will be briefly described below. Obviously, the drawings in the following description are only some embodiments of the present disclosure, and those skilled in the art can obtain other drawings according to the drawings without any creative work.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by a person of ordinary skill in the art based on the embodiments of the present disclosure without creative efforts are within the scope of the present disclosure.

In the following, the terms "first" and "second" are used for descriptive purposes only, and are not to be construed as indicating or implying a relative importance or implicitly indicating the number of technical features indicated. Thus, features defined by "first" and "second" may include one or more of the features either explicitly or implicitly. In the description of the embodiments of the present application, "multiple" means two or more unless otherwise stated.

With the continuous development of display technology, the full-screen display panel without borders has become a potential trend, and how to integrate fingerprint identification technology on the full screen has become a new challenge.

Figure 1:
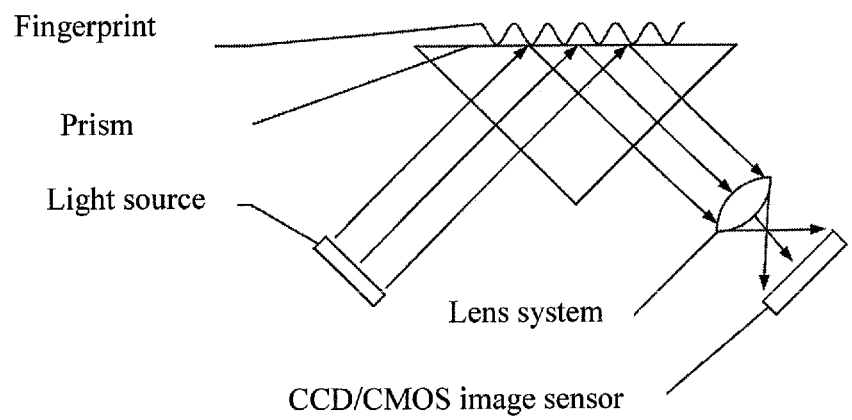
FIG. 1 is a schematic structural diagram of a fingerprint identification apparatus in the related art.

Currently, display technology mainly uses two types of fingerprint identification methods in the related art:

As shown in FIG. 1, an identification method for fingerprint collection is implemented based on the principle of total internal reflection destruction of light, which identifies fingerprint by enhancing contrast of fingerprint valley lines and ridge lines. However, due to the need to provide a variety of structures including a prism, a light source, a lens system, a CCD/CMOS image sensor, etc., the fingerprint collection apparatus is bulky and difficult to be applied to electronic terminal apparatuses such as mobile phones and tablet computers.

Wherein, the above "CCD" refers to a Charge Coupled Device, and "CMOS" refers to a Complementary Metal Oxide Semiconductor.

Figure 2:
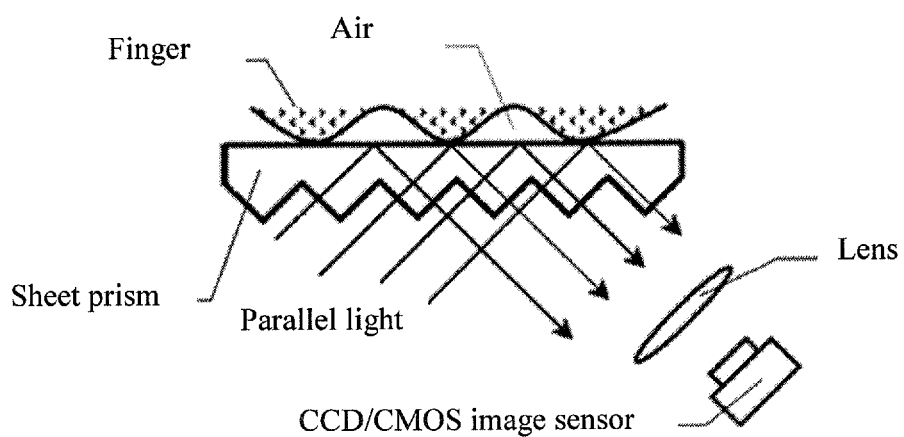
FIG. 2 is a schematic structural diagram of another fingerprint identification apparatus in the related art.

As shown in FIG. 2, another identification method for fingerprint collection is implemented based on the principle of total internal reflection destruction of light, which replaces the triangular prism with a sheet prism (ie, a prism sheet). Although it can reduce the size of the apparatus to a certain extent so that it can be applied to small electronic apparatuses such as mobile phones and tablet computers, the identification method requires that the light ray of the light source has a certain direction, and cannot be applied to fingerprint identification under the display screen of the electronic apparatus.

Figure 3:
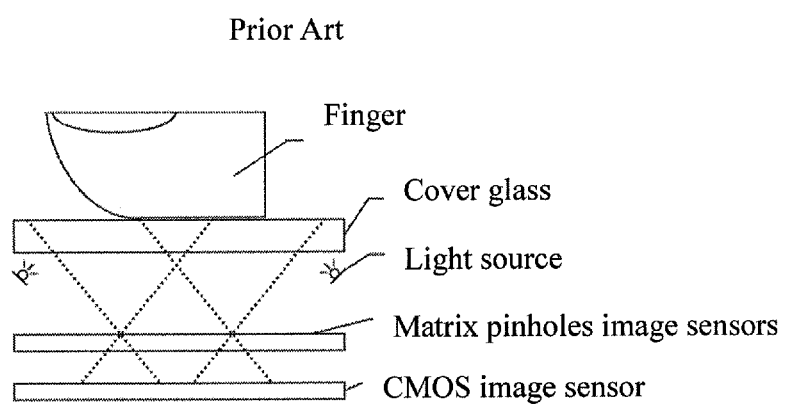
FIG. 3 is a schematic structural diagram of still another fingerprint identification apparatus in the related art.

As shown in FIG. 3, for another identification method based on matrix multi-pinholes imaging technology, fingerprint collection directly under the display screen can be realized. The identification method realizes fingerprint collection by setting the matrix pinholes image sensors under the display screen based on the principle of pin-hole imaging. However, the identification method requires very high PPI (pixels per inch) sensors, and can only be used for partial screen fingerprint identification, and it is difficult to achieve full screen fingerprint identification.

Figure 4A:
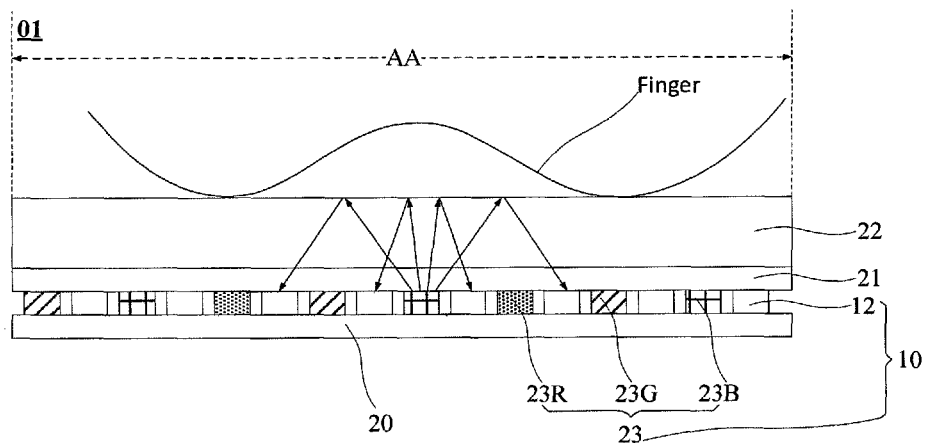
FIG. 4A is a schematic structural diagram of a display panel according to an exemplary embodiment of the present disclosure.
Figure 4B:
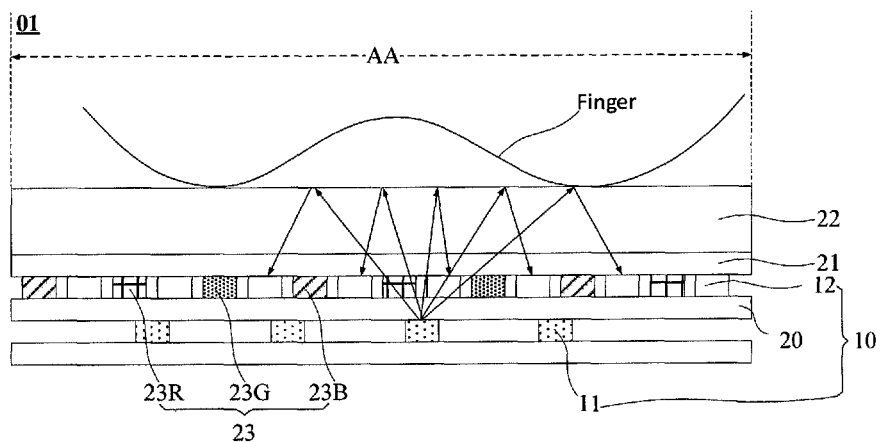
FIG. 4B is a schematic structural diagram of another display panel according to an exemplary embodiment of the present disclosure.

In an exemplary embodiment of the present disclosure, a display panel 01 is provided, which has a full screen fingerprint identification function as shown in FIG. 4A or FIG. 4B.

In one embodiment, the display panel 01 includes a fingerprint identification assembly 10 located within the display area (labeled AA in FIG. 4A or FIG. 4B). The fingerprint identification assembly 10 includes a plurality of point light sources 11 and a plurality of photosensitive units 12 arranged in an array.

Wherein, the point light source 11 is used to emit signal light, so that when the finger is pressed on the touch surface of the display panel 01, that is, a surface of the display panel 01 for display and touch and can be touched by the user, a cone shaped beam of light is emitted from the point light source 11, which irradiates the surface of the fingerprint and is then reflected back to the photosensitive units 12 in the display panel 01, for example, according to the light transmission path as indicated by an arrow in FIG. 4A or FIG. 4B, to perform the fingerprint identification operation.

The display panel 01 may be, for example, an Organic Light-Emitting Diode (OLED) display panel.

In one embodiment, continuing to refer to FIG. 4A, the point light source 11 described above may be a partial pixel unit 23 of the OLED itself. That is, the pixel unit 23 is used as an approximately ideal point light source. The point light sources 11 and the photosensitive units 12 are disposed on the base substrate 20. For example, the photosensitive units 12 may be integrated on an OLED backplate (BP).

In one embodiment, the display panel 01 further includes a conventional touch electrode layer 21. A polarizing film (Pol) may be disposed on the touch electrode layer 21 to realize integration of the Pol and the Touch. A structure such as a cover glass 22 may be bonded to the touch electrode layer 21 by an adhesive such as an Optically Clear Adhesive (OCA) for bonding an optical structure.

In order to make the obtained fingerprint image clearer, in the above display panel provided by the exemplary embodiment of the present disclosure, external light sources may be used to increase the optical power.

In one embodiment, as shown in FIG. 4B, the point light sources 11 are external light sources, and micro LED sources or mini LED sources may be used as approximately ideal point light sources.

In one embodiment, the pixel units 23 and the photosensitive units 12 are disposed on the base substrate 20. For example, the photosensitive units 12 may be integrated on an OLED backplate (BP), and the point light sources 11 arranged in the array are disposed under the base substrate 20. The signal light emitted from the point light sources 11 can be emitted through the gap between the pixel units 23 and the photosensitive units 12 to irradiate the surface of the fingerprint and is then reflected back to the photosensitive units 12 for fingerprint identification operation.

In the above structure, the base substrate 20 may be a substrate made of a rigid material such as glass or a substrate made of a flexible material such as polyimide (PI). The pixel unit 23 can be further divided into a plurality of sub-pixels such as a red sub-pixel 23R, a green sub-pixel 23G, and a blue sub-pixel 23B. The photosensitive sensor in the photosensitive unit 12 can be a PIN junction (ie, a PIN photodiode) or other photosensitive material that satisfies the conditions of being integrated on back panel.

In the above structure provided by one embodiment of the present disclosure, the plurality of point light sources 11 arranged in the array may form an array of point light sources. The fingerprint ridge lines are directly in contact with the touch surface of the display panel (for example, the cover glass), and the fingerprint valley lines are recessed relative to the fingerprint ridge lines. That is, the fingerprint valley lines do not contact the touch surface. As such, there is an air layer at the interfaces of the fingerprint valley lines. Therefore, at the position of the ridge line, light will enter the skin from the glass and is scattered. At the position of the valley line, light will enter the air from the glass. When the angle of the light from the point light source reaches or exceeds the total reflection angle of the light at the interface between the glass and the air, all light reaching the interfaces of the fingerprint valley lines will be 100% reflected. That is, the range of light reflected from the interfaces of the fingerprint valley lines back to the sensor by the point light source is between the total reflection angle and an angle greater than the total reflection angle. In this way, fingerprint identification can be realized according to the difference in light intensity between the fingerprint valley lines and the fingerprint ridge lines.

Figure 5:
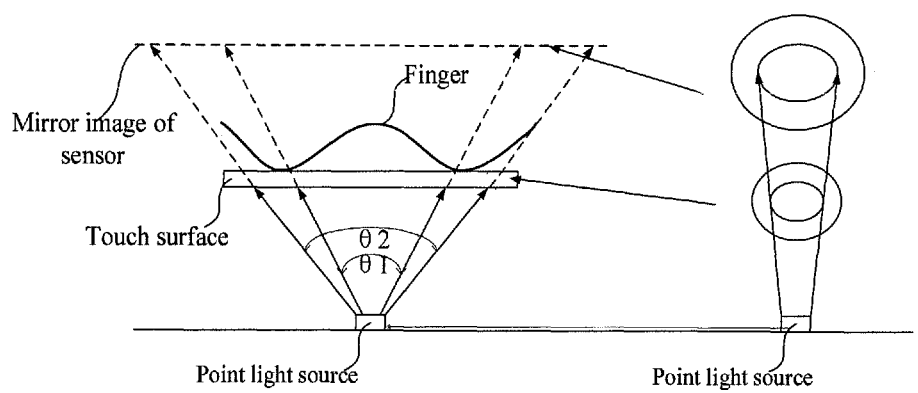
FIG. 5 is a schematic diagram showing principle of imaging characteristics of light emitted by a point light source at a fingerprint interface according to an exemplary embodiment of the disclosure.

In one embodiment, the projection range of the light emitted by a point light source at the fingerprint interface is a circle. However, as shown in FIG. 5, since the light intensity drops significantly as the divergence angle increases, not all regions within the projection range of the point light source are effective regions for identifying the fingerprint information. The divergence angle of the boundary of the light merely capable of identifying the fingerprint is e 1.

In addition, within the total reflection angle, according to the relevant simulation experiment of fingerprint identification by point light sources, the reflectivity of the interface at the fingerprint valleys is usually only about 4%. Therefore, when the point light source power is insufficient to cause the 4% returned light to be imaged at the sensor, the boundary of the light source radiation ineffective area is the total reflection angle. When the power of the light source is increased such that 4% of the returned light is sufficient to cause the 4% returned light to be imaged at the sensor, the boundary of the light source ineffective area will move inward. However, since the point light source is practically impossible to be an ideal point, it must have a certain size. Therefore, a valid fingerprint image cannot be collected in a central area where the divergence angle is small, and thus there is still a small area of central ineffective area. Thus, in practice, the divergence angle of the light of the effective radiation range of a point light source on the fingerprint interface is an annular area between θ1 and θ2.

Moreover, it can be understood that, since the sensor receives the reflected light from the touch surface, the annular fingerprint image formed by the reflected light on the sensor interface is an enlarged image of the original fingerprint image.

Here, for convenience of illustration, as shown in FIG. 5, a mirror image of the sensor is shown on the side of the touch surface opposite from the point light source. The actual position of the sensor should be on the side of the touch surface facing the point light source.

In this way, since the point light source is located at the center of the circle, the point light source has an ineffective radiation area (ie, a central ineffective area) at the center of the effective radiation area of the fingerprint interface.

Figure 6:
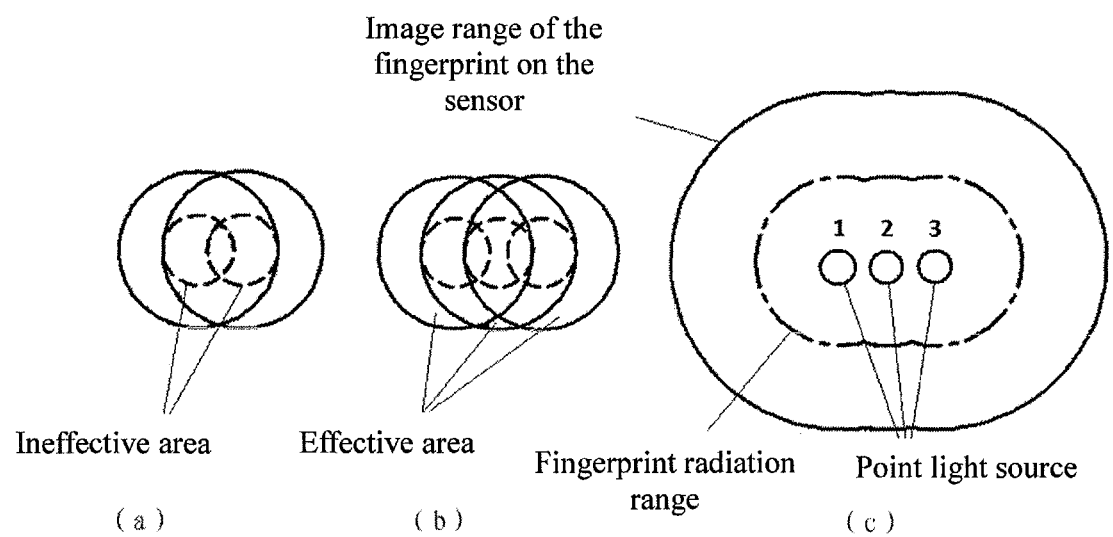
FIG. 6 is a schematic diagram showing principle of radiation range and image range of three point light sources in an exemplary embodiment of the present disclosure.

Therefore, as shown in FIG. 6, in order to cover the central ineffective area of a point light source, it is required that the central ineffective area of the point light source is covered by the effective radiation area of the adjacent point light source. That is, the center ineffective area of the adjacent point light source is covered by the annular effective radiation area of a point light source. When the effective radiation range of the point light source is large enough (ie, the center circle portion is small enough), only one adjacent point light source is needed to completely cover the central ineffective area.

The effective radiation range of a point light source usually depends on the power of the point light source and the performance of the sensor. Therefore, it is often difficult to completely cover the central ineffective area with only one adjacent point light source. That is, as shown in FIG. 6(a), when only one point light source is used to cover the central ineffective area of another adjacent point light source, it will occur that the area where the central ineffective areas of the two point light sources intersect is still not covered by the effective radiation range. Therefore, two or more adjacent point light sources are required to completely cover the central ineffective area of one point light source, and the following description takes two adjacent point light sources as an example. That is, three adjacent point light sources can be regarded as a set of point light sources, and any two point light sources in a group can cover the central ineffective area of the other point light source. In this way, the three adjacent point light sources can form a large effective range of radiation, and there is no central ineffective area within the effective range.

That is, as shown in FIG. 6 (b), the effective radiation area of the three point light sources can completely cover the three center ineffective areas in the middle.

Further, as shown in FIG. 6 (c), the effective radiation ranges of the three point light sources labeled "1," "2" and "3" overlap one another to form a fingerprint radiation range having a contour shape similar to an ellipse. The image range of the fingerprint on the sensor is a magnified image of the original fingerprint area, so the image range of the fingerprint on the sensor is outside the fingerprint radiation range.

Figure 7:
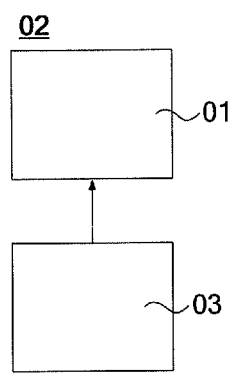
FIG. 7 is a schematic structural diagram of a fingerprint identification display module according to an embodiment of the present disclosure.

Based on this, one embodiment of the present disclosure provides a fingerprint identification display module. As shown in FIG. 7, the fingerprint identification display module 02 includes: a display panel 01 and a control module 03. As shown in FIG. 4B, the display panel 01 includes a fingerprint identification assembly 10 located in the display area AA and a plurality of pixel units 23 arranged in an array. The fingerprint identification assembly 10 is configured to perform fingerprint identification operation.

Figure 8:
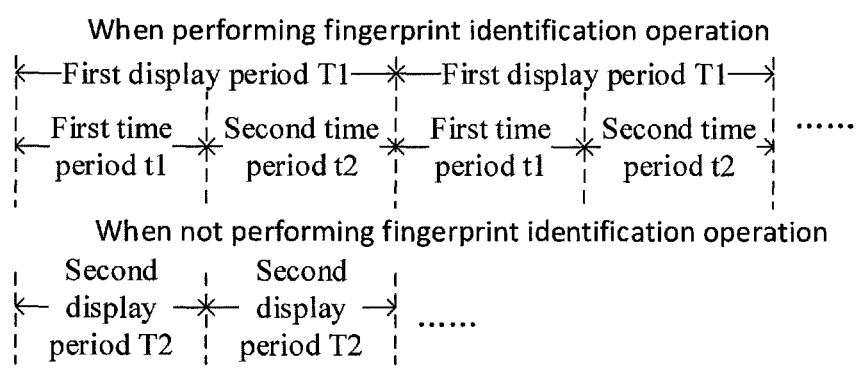
FIG. 8 is a schematic diagram of operation of a control module in different stages of a fingerprint identification display module according to an embodiment of the present disclosure.

In one embodiment, as shown in FIG. 8, when the fingerprint identification operation is performed, the control module 03 is configured to drive the plurality of pixel units 23 to perform refreshing of the display screen during the first time period t1 of the first display period T1, and drive the fingerprint identification assembly 10 to perform fingerprint identification operation during the second time period t2 of the first display period T1. Wherein, the first display period T1 includes a first time period t1 and a second time period t2, and a second time period t2 is located between two adjacent first time periods t1. The first display period T1 is an interval time between the start of refreshing of the plurality of pixel units 23 when one frame of the screen is displayed and the start of refreshing of the plurality of pixel units 23 when the next frame of the screen is displayed.

Here, when the display panel 01 is normally displayed, after refreshing of one frame of image is completed, the next frame is refreshed immediately. Thus, the interval time of two adjacent refreshing times is the refreshing time of a plurality of pixel units of each frame of the image. When fingerprint identification is performed, in order to eliminate signal interference of the display signal to the fingerprint identification assembly 10, a processing method of temporarily reducing the display refreshing frequency (ie, frequency reduction processing) is adopted. Between two adjacent first time periods t1, the fingerprint identification assembly 10 is driven to identify the fingerprint of the finger touched on the display panel 01 during the second time period. As such, the interference of the display signal on the fingerprint identification can be avoided.

Based on the above, the fingerprint identification display module 02 provided by the embodiment of the present disclosure can not only realize full-screen fingerprint identification, but also can reduce the interference of the display signal on the fingerprint identification by the frequency reduction processing, thereby improving the identification precision.

Moreover, by increasing the duration of the second time period, the time for the fingerprint identification assembly 10 to identify the fingerprint can be improved, thereby improving the accuracy of fingerprint identification.

In one embodiment, as shown in FIG. 8, the control module 03 is further configured to drive the plurality of pixel units 23 to perform refreshing of display screen in the second display period T2 when the fingerprint identification operation is not performed. Wherein, the second display period T2 is an interval time between the start of refreshing of the plurality of pixel units 23 when one frame is displayed and the start of refreshing of the plurality of pixel units 23 when the next frame is displayed at the time when no fingerprint identification is performed. The second display period T2 is smaller than the first display period T1.

Thus, when fingerprint identification is not performed, the plurality of pixel units 23 are driven to refresh the display screen frame by frame in accordance with as the second display period T2 as the operational time of each frame. That is, immediately after refreshing of one frame of image is completed, the next frame of image is refreshed.

In one embodiment, to simplify the control difficulty of the control module 03 and reduce the influence on the display of the image by the pixel units 23, the time of the second display period T2 is equal to the first time period t1 in the first display period T1. For example, the time of the second display period T2 and the first period of time t1 may each be 16.7 ms required for refreshing of each frame of the conventional display panel.

In one embodiment, continuing to refer to FIG. 4B, the fingerprint identification assembly 10 includes: a plurality of point light sources 11 arranged in an array. The point light sources 11 are used to emit fingerprint identification signal light. The plurality of photosensitive units 12 is arranged in an array, and the photosensitive units 12 are used to receive signal light reflected by the finger to identify the fingerprint.

The pixel units 23 includes a plurality of sub-pixels such as 23R, 23G, and 23B labeled in FIG. 4B; and the photosensitive unit 12 is disposed between two adjacent sub-pixels.

Figure 9A:
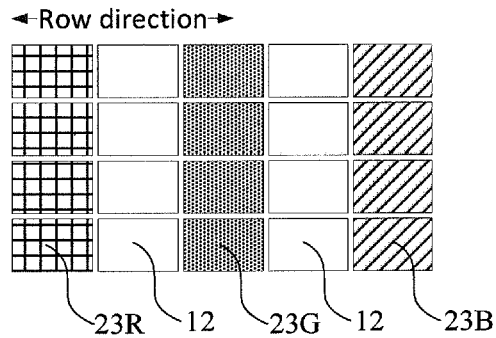
FIG. 9A is a schematic diagram of an arrangement of photosensitive units and sub-pixels in a fingerprint identification display module according to an embodiment of the present disclosure.
Figure 9B:
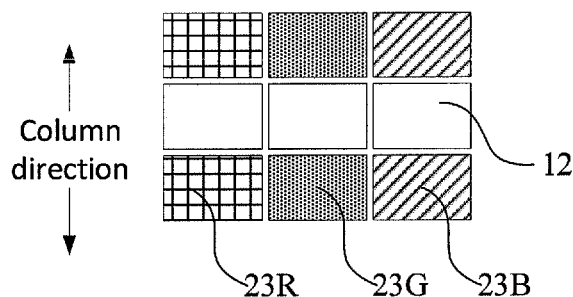
FIG. 9B is a schematic diagram of an arrangement of photosensitive units and sub-pixels in a fingerprint identification display module according to an embodiment of the present disclosure.
Figure 9C:
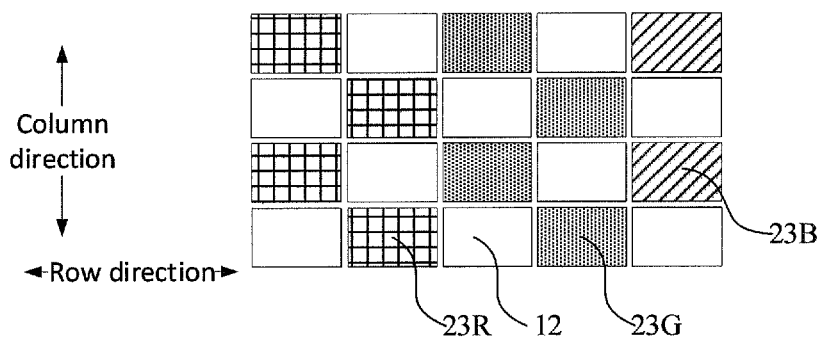
FIG. 9C is a schematic diagram of still an arrangement of photosensitive units and sub-pixels in a fingerprint identification display module according to an embodiment of the present disclosure.

In one embodiment, the arrangement between the photosensitive unit 12 and two adjacent sub-pixels may be exemplified by setting one photosensitive unit 12 between every two adjacent sub-pixel units (labeled as 23R, 23G, and 23B in FIG. 9A) in the row direction as shown in FIG. 9A. In one embodiment, as shown in FIG. 9B, in the column direction, a photosensitive unit 12 is disposed between every two adjacent sub-pixel units (labeled as 23R, 23G, and 23B in FIG. 9B). In one embodiment, as shown in FIG. 9C, a photosensitive unit 12 is disposed between every two adjacent sub-pixel units (labeled as 23R, 23G, and 23B in FIG. 9C) in the row direction and the column direction, respectively.

The arrangement between the photosensitive unit 12 and the two adjacent sub-pixels can be flexibly adjusted according to the specific requirements of the fingerprint identification. The embodiments of the present disclosure include, but are not limited to, the setting manners of the above three examples.

Figure 10:
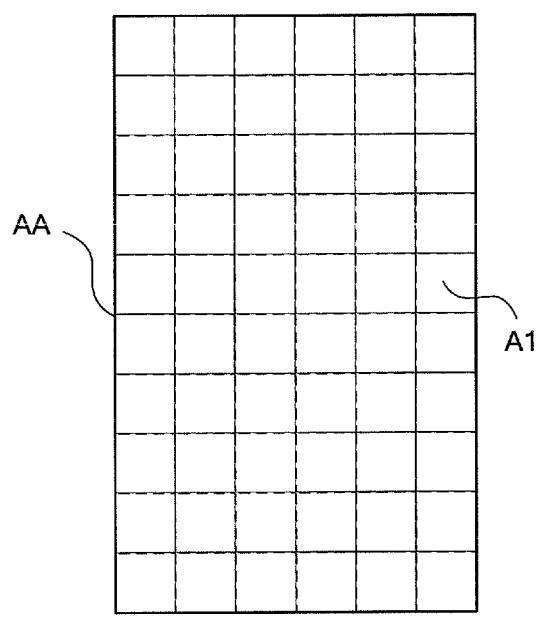
FIG. 10 is a schematic diagram of partitioning of a display area in a fingerprint identification display module according to an embodiment of the present disclosure.

In one embodiment, as shown in FIG. 10, the display area AA includes: a plurality of detection areas A1; and each of the detection areas A1 is provided with a plurality of point light sources and a plurality of photosensitive units.

Here, the number of the detection areas A1 illustrated in FIG. 10 is only an example, which is not limited by the embodiment of the present disclosure.

In one embodiment, referring to FIG. 4B, the display panel 01 further includes: a touch electrode layer 21 located in the display area AA. The structure of the touch electrode layer 21 may include touch driving electrodes (Tx) and touch sensing electrodes (Rx). The principle of the touch electrode layer is in the prior art, which is not limited in the embodiment of the present disclosure.

In one embodiment, the control module 03 is further configured to determine a touch position through the touch electrode layer 21, and determine at least one detection area A1 including the touch position based on the touch position determined, and accordingly drive the plurality of point light sources 11 in the driving detection area to be turned on, and drive the plurality of photosensitive units 12 in the driving detection area to receive the fingerprint identification signal light reflected by the finger.

In this way, only the point light sources and the photosensitive units in the determined detection area A1 can be turned on according to the determined specific touch position, thereby simplifying the circuit structure. That is, the fingerprint image is partitioned collected, thereby reducing power consumption and simplifying the circuit structure.

Wherein, the area of the detection area may be set to be larger than the area of the finger pressing area at the touch position. When the finger is pressed in a detection area, the point light sources and the photosensitive units in the detection area are turned on. When the finger is pressed at the junction of two or more adjacent detection areas, the point light sources and the photosensitive units in the several detection areas are turned on.

For the sake of simplicity, the portion of the display panel including the point light sources, the photosensitive units, and the pixel units may be referred to as a display backplate 01A.

Figure 11:
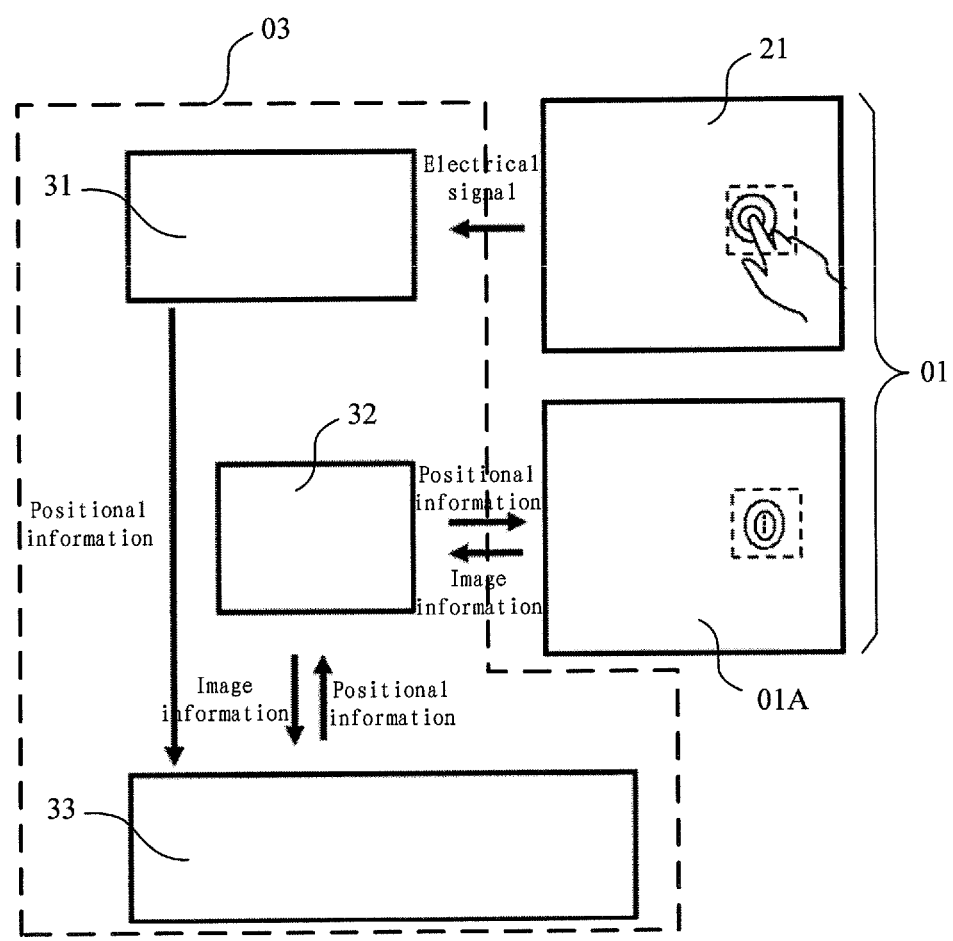
FIG. 11 is a logic diagram of a basic implementation of a fingerprint identification display module according to an embodiment of the present disclosure.

A basic logic structure of the control module 03 provided by one embodiment of the present disclosure is that, as shown in FIG. 11, when the finger is pressed on the touch surface of the display panel, the touch electrode layer 21 located in the pressing area of the finger will generate a corresponding electrical signal. The touch electrode layer 21 transmits the electrical signal to the control IC 31 to obtain positional information of the finger pressing area. After the control IC analyzes, the corresponding detection area is determined, and the positional information is transmitted to the image processing/timing control/power management IC 33, and is transmitted to the display backplate 01A through the driving IC 32. In a second time period, the turning on of a point light source in the detection area and the collection of the reflected light by the fingerprint by the plurality of photosensitive units in the detection area (ie, collection of a fingerprint image) are completed.

According to the setting method of the point light sources covering one another in the foregoing, it is necessary to sequentially turn on three point light sources in one detection area. Each time a point light source is turned on, a plurality of photosensitive units in the detection area is scanned once, and the collected fingerprint information (ie, the photocurrent generated by the photosensitive unit receiving light reflected by the fingerprint) is transmitted back to the driving IC 32. A fingerprint image is acquired after three scans, and image processing is performed by the image processing/timing control/power management IC 33 to obtain a final fingerprint image.

On the basis of the above, one embodiment of the present disclosure further provides a fingerprint identification method applied to the fingerprint identification display module, and the method includes step S1:

During step S1, when the fingerprint identification operation is performed, the plurality of pixel units is driven to perform refreshing of the display screen in the first time period of the first display period, and the fingerprint identification assembly is driven to perform fingerprint identification in the second time period of the first display period.

Wherein, the first display period includes a first time period and a second time period, and a second time period is located between two adjacent first time periods. The first display period is an interval time between the starting of refreshing of a plurality of pixel units when one frame of the screen is displayed and the starting of refreshing of a plurality of pixel units when the next frame of the screen is displayed at the time when the fingerprint identification operation is performed.

In this way, when fingerprint identification is performed, in order to eliminate signal interference of the display signal to the fingerprint identification assembly, a processing method of temporarily reducing the display refresh frequency (ie, frequency reduction processing) is adopted. Between two adjacent first time periods of two adjacent frames, the fingerprint identification assembly is driven to perform fingerprint identification operation in a second time period, thereby avoiding interference of the display signal on fingerprint identification.

In one embodiment, the fingerprint identification method further includes step S2:

During step S2, the plurality of pixel units is driven to perform refreshing of the display screen in the second display period when the fingerprint identification operation is not performed. Wherein, the second display period is an interval time between the start of refreshing of a plurality of pixel units when displaying one frame of the screen and the start of refreshing of a plurality of pixel units when displaying the next frame of the screen at the time when the fingerprint identification operation is not performed. The second display period is less than the first display period.

Thus, when fingerprint identification is not performed, the plurality of pixel units 23 are driven to refresh the display screen frame by frame in accordance with the second display period T2 as the working time of each frame. That is, immediately after refreshing of one frame of image is completed, the next frame of image is refreshed.

In one embodiment, to simplify the identification process, the time of the second display period is equal to the first time period in the first display period. For example, both the time of the second display period and the first time period may be 16.7 ms required for refreshing of each frame of the conventional display panel.

In one embodiment, before performing the foregoing step S1, the fingerprint identification method further includes steps S11 and S12:

Step S11 includes dividing the display area into multiple detection areas.

Step S12 includes determining, according to the touch location, at least one detection area overlapping the touch position and a plurality of point light sources corresponding to the touch position.

Correspondingly, the above step S1 includes the step S1':

Step S1' includes, in the second time period, driving a plurality of point light sources corresponding to the touch position to illuminate one by one in a manner of one point light source illuminating in one second time period, and driving a plurality of photosensitive units in the detection area to identify the fingerprint of the finger touches on the display panel.

In one embodiment, the above S11 further includes: dividing each detection area into a plurality of detection sub-areas, each detection sub-area is provided with at least one point light source group, and each point light source group comprises a plurality of point light sources.

Correspondingly, the foregoing step S1' specifically includes: driving a plurality of point light sources in at least one detection sub-area overlapping the touch position to illuminate the point light sources one by one in a manner of illuminating one in one second time period.

In this way, by performing virtual re-zoning of the detection area, the turning-on area of the point light source can be further accurately located, so that the light sensing of the photosensitive units is prevented from interfering with each other when the plurality of point light sources are simultaneously turned on.

In one embodiment, each point light source group includes three point light sources as an example. In the first second time period, the first point light source is illuminated and the first time fingerprint collection by a plurality of photosensitive units in the corresponding detection area is completed. In the second time period, the second point light source is illuminated and the second fingerprint collection by s plurality of photosensitive units in the corresponding detection area is completed. In the third second time period, the third point light source is illuminated and the third fingerprint collection by the plurality of photosensitive units in the corresponding detection area is completed.

Wherein, the first time period between two adjacent second time periods is a time when the plurality of pixel units displays the image.

In one embodiment, the second time period further includes: an opening period and a reading period. The plurality of photosensitive units in the corresponding detection area is turned on one by one in the opening period. After being turned on, the plurality of photosensitive units in the corresponding detection area sequentially perform photocurrent integration in the reading period to perform the fingerprint identification operation.

The fingerprint identification method provided by the embodiment of the present disclosure can eliminate the signal interference of the display signal to the photosensitive units when fingerprint identification is performed, and adopt a processing method of temporarily reducing the display refresh frequency (ie, frequency reduction processing). Between two adjacent frames, the fingerprint identification assembly is driven to identify the fingerprint of the finger touched on the display panel 01 during the second time period, so that the interference of the display signal on the fingerprint identification can be avoided.

Figure 12:
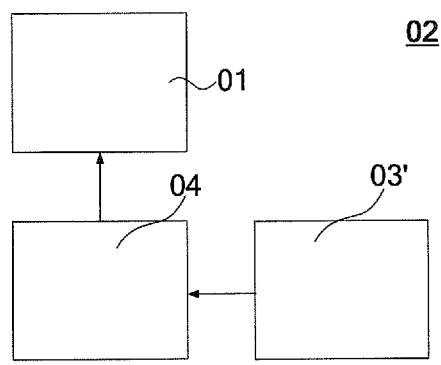
FIG. 12 is a schematic structural diagram of a fingerprint identification display module according to an embodiment of the present disclosure.

Another embodiment of the present disclosure provides a fingerprint identification display module, as shown in FIG. 12, comprising: a display panel 01, a photosensitive unit control circuit 04, and a control module 03'. As shown in FIG. 4B, the display panel 01 includes: a touch electrode layer 21 located in the display area AA and a plurality of photosensitive units 12 arranged in an array, and the photosensitive units 12 are configured to receive the fingerprint identification signal light reflected by the finger to identify the fingerprint.

In one embodiment, continuing to refer to FIG. 10, the display panel 01 further includes: a plurality of detection areas A1 located in the display area AA. The control module 03' is configured to determine a touch position of a finger touched on the display panel 01 through the touch electrode layer 21, and determine at least one detection area A1 overlapping the touch position according to the touch position. The photosensitive unit control circuit 04 is configured to turn on the photosensitive units 12 in the at least one detection area A1 overlapping the touch position under the control of the control module 03 to identify the fingerprint of the touch position.

Thus, the photosensitive units 12 in the at least one detection area A1 overlapping the touch position are precisely controlled by the photosensitive unit control circuit 04 and the control module 03 to identify the fingerprint of the touch position.

Based on the above, the fingerprint identification display module 02 provided by the embodiment of the present disclosure can not only realize full-screen fingerprint identification, but also can reduce the energy consumption and simplify the circuit structure by partitioned driving the photosensitive units 12 according to different areas.

Figure 13:
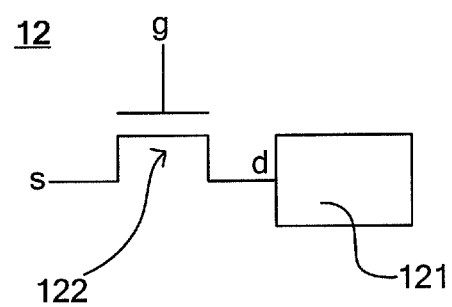
FIG. 13 is a schematic structural diagram of a photosensitive unit in a fingerprint identification display module according to an embodiment of the present disclosure.

In one embodiment, as shown in FIG. 13, the photosensitive unit 12 includes a photosensitive element 121 for receiving signal light reflected by a finger to generate a photocurrent and a first switching unit 122 for controlling an output of the photocurrent generated by the photosensitive element 121.

In one embodiment, the input terminal of the first switching unit 122 (eg, the drain, labeled d in FIG. 13) is electrically connected to the corresponding electrode of the photosensitive element. Wherein, the control terminal (or referred to as the gate) of the first switching unit 122 is denoted as g in FIG. 13, and the output terminal (or referred to as the source) of the first switching unit 122 is denoted as s in FIG. 13.

Figure 14:
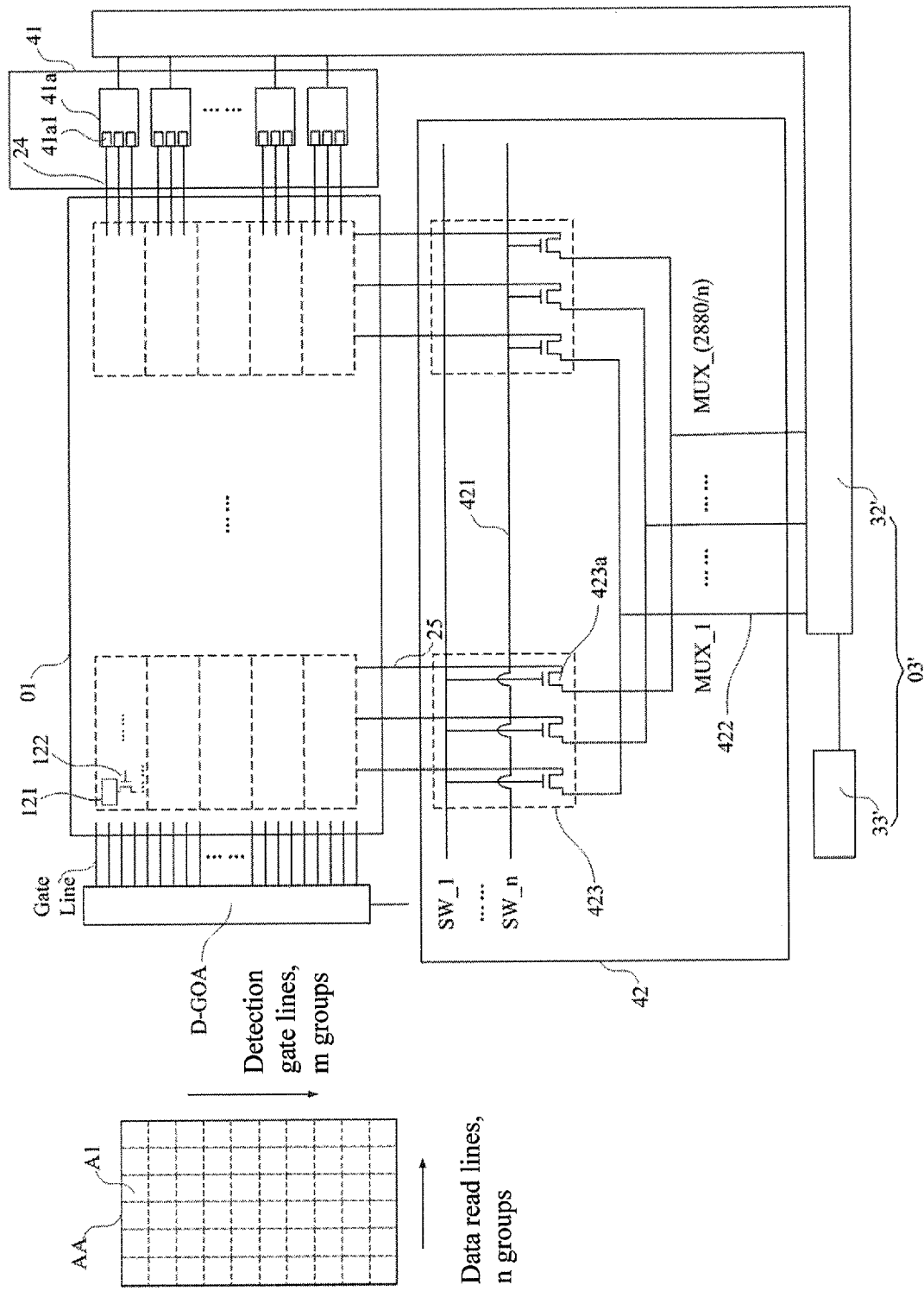
FIG. 14 is a schematic structural diagram of a driving circuit in a fingerprint identification display module according to an embodiment of the present disclosure.

In one embodiment, as shown in FIG. 14, the above-described photosensitive unit control circuit 04 includes a first circuit 41 and a second circuit 42.

Wherein, the first circuit 41 is connected to the control terminals of the first switch units for turning on a plurality of first switch units in at least one detection area overlapping the touch position under the control of the control module 03'.

The second circuit module 42 is connected to the output terminals of the first switching units for reading, under the control of the control module 03', the photocurrent outputted by the output terminals of the plurality of first switching units in the at least one detection area overlapping the touch position, thereby realizing turning on of the photosensitive elements in the selected detection area.

In one embodiment, referring to FIG. 14, the display panel 01 further includes: detection gate lines 24 connecting to the control terminals of each row of the first switching units 122, and the number of the detection gate lines 24 is X; and data read lines 25 connecting to the output terminals of each column of the first switch units 122, and the number of the data read lines 25 is Y.

In one embodiment, the X detection gate lines 24 are divided into m groups, the Y data read lines 25 are divided into n groups, and the number of detection areas A1 is m*n. Each detection area A1 is sequentially arranged with X/m detection gate lines 24 and sequentially arranged Y/n data read lines 25. X, Y, m, and n are positive integers greater than 1, and X>m, Y>n.

Thus, the detection gate lines 24 connecting to the control terminals of each row of the first switching units 122, and the data reading lines 25 connecting to the output terminals of each column of the first switching units 122 are partitioned divided. As such, each detection area A1 is a rectangular area containing the (X*Y)/(m*n) first switch units connecting to X/m detection gate lines arranged in sequence as well as connecting to Y/n data read lines arranged in sequence and the photosensitive elements corresponding to the first switch units.

Referring to FIG. 14, the first circuit 41 includes: m detection gate driving circuits 41a corresponding to the m groups of detection gate lines one by one. Each of the detection gate driving circuits 41a is configured to control a plurality of first switching units 122 in one group to be turned on row by row. In one embodiment, each of the detecting gate driving circuits 41a includes: X/m cascaded shift register units (GOA) 41a1, and each shift register unit 41a1 is connected to one of the detection gate lines 24 in one group.

The second circuit module 42 includes: n selection gate lines 421, Y/n selection transmission lines 422, n data selection units (MUX) 423 corresponding to n groups one by one. Each of the data selection units 423 includes Y/n second switch units 423a that are in one-to-one correspondence with the Y/n data read lines 25 in each group.

In one embodiment, the input terminal of each of the second switch units 423a is connected to a data read line 25. The control terminals of the Y/n second switch units 423a in the same data selection unit 423 are connected to the same selection gate line 421. The output terminals of the i-th second switch unit 423a in each of the data selection units 423 are connected to the same selection transmission line 422, i is taken from 1 to Y/n, and the number of the selection transmission lines 422 of the data selection units is Y/n in total.

In this way, when Y/n second switch units 423a in one data selection unit 423 are turned on by one selection gate line 421, the photocurrent generated on the respective photosensitive elements is transmitted from the data read line 25 connected to the second switching units 423a through a same selection transmission line 422, thereby reducing the number of selection transmission lines 422 and the number of pins used.

Further, the above control module 03' includes a driving IC 32' and an image processing IC 33'. Wherein, the driving IC 32' is configured to output a control terminal start signal (ie, an STV signal) to the detection gate driving circuit 41a. An input terminal for receiving the control terminal start signal in each of the detection gate driving circuits 41a is independently connected to each gate driving pin of the driving IC 32'. Moreover, the driving IC 32' is further configured to output a selection start signal to the n selection gate lines 421. Moreover, the driving IC 32' is further configured to read the photocurrent transmitted by the selection transmission lines 422, and each of the selection transmission lines 422 is independently connected to each of the source driving pins of the driving IC 32'. The image processing IC 33' is configured to acquire a fingerprint image based on the photocurrent output from the driving IC 32'.

Here, all the input terminals on the detection gate driving circuit 41a for receiving the remaining signals (such as VGL signal, VSS signal, VDD signal, CLK signal) are connected to the same pin of the driving IC 32' for outputting the corresponding signals.

Further, one embodiment of the present disclosure further provides a fingerprint identification method for the fingerprint identification display module, and the fingerprint identification method includes the following steps S3 and S4:

Step S3 includes determining a touch position of the finger touched on the display panel, and determining, according to the touch position, at least one detection area overlapping the touch position.

Step S4 includes turning on the photosensitive units in the at least one detection area overlapping the touch position to identify the fingerprint at the touch position.

In one embodiment, the photosensitive units can be partitioned driven by the photosensitive unit control circuit and the control module, thereby reducing power consumption and simplifying the circuit structure.

Further, the above step S4 specifically includes step S41 and step S42:

Step S41 includes turning on a plurality of first switching units in the at least one detection area overlapping the touch position. The method includes: outputting a control terminal start signal to the detection gate driving circuit corresponding to the at least one detection area overlapping the touch position to turn on the plurality of first switching units in the at least one detection area overlapping the touch position.

Step S42 includes reading the photocurrent outputted by the output terminals of the plurality of first switching units in the at least one detection area overlapping the touch position. In one embodiment, Step S42 include steps S42a and step S42b:

Step S42a includes outputting a selection start signal to at least one selection gate line, and the selection gate line is connected to the control terminal of the second switching unit, and the input terminal of the second switching unit is connected to a data read line corresponding to the at least one detection area overlapping the touch position.

Step S42b includes reading the photocurrent transmitted by the selection transmission line connected to the output terminal of the corresponding second switching unit.

In one embodiment, the fingerprint identification method further includes step S5:

Step S5 includes acquiring a fingerprint image based on the read photocurrent.

The specific structure of the driving circuit in the fingerprint identification display module provided by one embodiment of the present disclosure is described in detail below by taking a display panel of a Quad High Definition type active OLED (QHDAMOLED) as an example.

The display panel of QHDAMOLED is usually provided with 2560 gate lines and 2880 data lines, that is, the resolution is 2560*2880. The ratio of the photosensitive units and the display pixels integrated in the display panel is 1:1, that is, one sub-pixel displayed corresponds to one photosensitive element such as a PIN type, and each PIN is electrically connected with a first switching unit. Therefore, additional 2560 detection gate lines of the first switching units and 2880 read lines of the first switching units are required in the display panel to drive the photosensitive elements.

In this way, the number of pins (or channel pins) on the driver IC for transmitting the corresponding signals needs to be increased enough to drive the required number of photosensitive elements. However, in fact, the number of unused pins on the driver IC provided by the conventional technology is much smaller than that required for driving the photosensitive elements. Therefore, a special design is required to reduce the number of pins on the driver IC required to drive the photosensitive elements.

One embodiment of the present disclosure achieves the above object by dividing the photosensitive units arranged in the array into a plurality of functional areas, as described below.

In one embodiment, as shown in FIG. 14, the connection pattern of the gate lines, the data lines and the circuit of each sub-pixel still follows the relevant design. That is, in the row direction of the display panel (i.e., on the gate side), the gate lines of the sub-pixels (labeled as Gate Line in FIG. 14) are still driven in accordance with the original GOA circuit (labeled as D-GOA in FIG. 14) and a gate line is connected to a shift register unit in the GOA circuit. In the column direction of the display panel (i.e., on the source side), the data lines of the sub-pixels still correspond to the pins on the driver IC 32' in an initial manner, i.e., one data line corresponds to one pin on the driver IC.

The X (X=2560) detection gate lines 24 distributed in the display area are divided into m groups (m is, for example, 10) and Y (Y=2880) data read lines 25 are divided into n groups (n is, for example. 6), thus the display area of the entire display panel can be divided into detection areas of m*n=10*6=60 rectangles.

On the gate side, every area in the m groups is driven using an independent detection gate driving circuit 41a, so that a total of m=6 detection gate driving circuits 41a are required. 2560/m=256 detection gate lines 24 in each area are connected one by one to the shift register units 41a1 in the detection gate driving circuit 41a, respectively.

Since the detection gate lines 24 in each group do not need to simultaneously load signals, the detection gate lines 24 in one of the m groups including the determined detection area are required to load signals. Thereby, the scanning time of the detection gate lines can be reduced, and the efficiency of fingerprint identification is improved. Therefore, the input terminal for receiving the control terminal start signal (ie, the STV signal) on each of the detection gate driving circuits 41a is independently connected to one pin of the driving IC 32'. The input terminals of the detection gate driving circuit 41a for receiving the remaining signals (ie, the VGL signal, the VSS signal, the VDD signal, and the CLK signal) are connected to the same pin of the driving IC 32' for outputting the corresponding signals. That is, the input terminals for receiving the remaining signals can use a common pin, and these pins can be further shared as the pins of the displayed GOA circuit that output the same signal.

In this way, the added m detection gate driving circuits 41a only add about 10-20 pins on the driving IC. Here, the increase of the number of about 10-20 pins is based on m=10, and is estimated according to design experience. The specific values are only illustrative.

On the source side, 2880 data read lines 25 are divided into n groups, and each group has 2880/n data read lines 25. The data read lines of then groups of the photosensitive elements are turned on by using external MUX circuits, and the number of the selection transmission lines 422 of the MUXs is 2880/n in total (It is sequentially labeled as MUX_1 . . . MUX_(2880/n) in FIG. 14).

In the n groups, the Y/n data read lines 25 in each group are connected one by one to the input terminals of second switch units 423a. The control terminals corresponding to all of the second switching units 423a in each group are connected to the same selection gate line 421, and there is a total of n selection gate lines 421 (labeled as SW_1 . . . SW_n in FIG. 14 in turn). The output terminals of the i-th second switching unit 423a in each data selection unit 423 are connected to the same selection transmission line 422, and i is taken from 1 to Y/n. Then, the selection transmission line 422 of the data selection unit is 1/n (i.e., one selection transmission line 422 corresponds to n data selection units 423).

Thus, when one of the second switching units 423a (SW, switch) is turned on, only the data read line 25 of the corresponding area is turned on, and the other areas are turned off. If n=6, corresponding to all 2880 data read lines 25, only 6 (6 SW pins)+2880/6 pins are needed on the driver IC, which greatly reduces the number of pins used on the driver IC.

In this way, through the above circuit design, by partitioning the data read lines, the data selector (MUX) is used in combination with the SW switch to reduce the pins required to drive the IC when the data read line of the photosensitive element is directly connected to the driving IC. At the same time, the division of the detection gate lines is completed by using multiple GOAs. Finally the collection area of the photosensitive elements is divided into a plurality of rectangular detection areas. Thereby, the partitioned collection of the fingerprint image is realized, and the number of pins on the driving IC is controlled within permission range of the process. As such, the feasibility of implementing the above scheme on the circuit structure is significantly increased.

Taking the above-mentioned QHDAMOLED display panel as an example, the refresh frequency of the conventional display is 60 Hz, and the above-mentioned frequency reduction processing procedure is described in detail in combination with the above circuit design.

Figure 15:
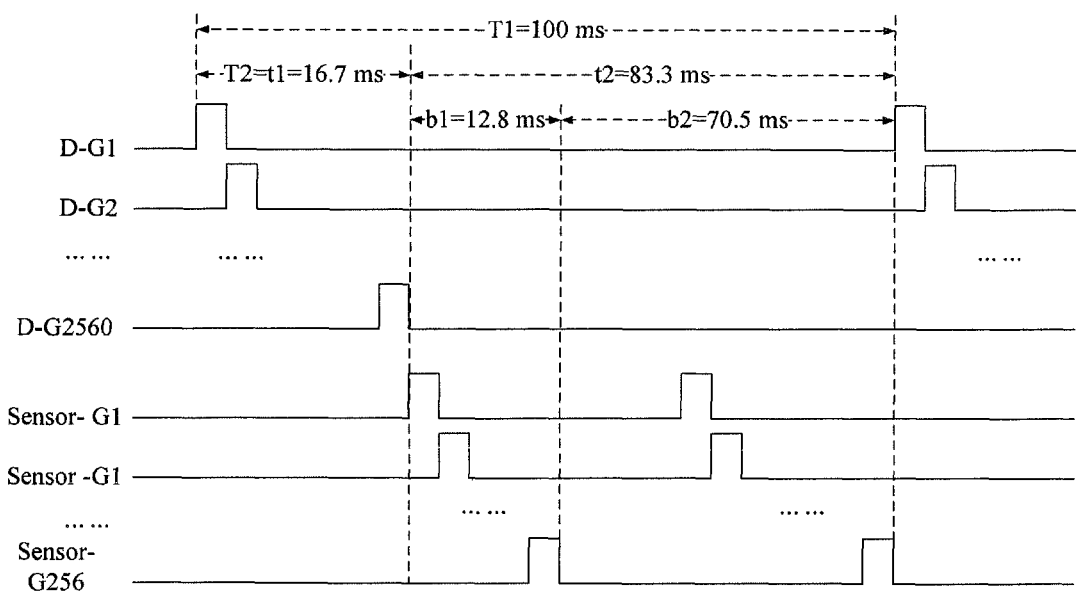
FIG. 15 is a sequence diagram of a frequency reduction process of a fingerprint identification display module according to an embodiment of the present disclosure.

As shown in FIG. 15, the refresh rate of the display panel during normal display is 60 Hz. That is, when fingerprint identification is not required, the plurality of pixel units are driven to refresh the display screen frame by frame according to the working time of each frame as being the second display period T2 (T2=1/60 Hz=16.7 ms). That is, immediately after refreshing of one frame of image is completed, the next frame of image is refreshed.

Then, the refresh time of the gate signal for loading each gate line per frame is 16.7 ms, wherein the gate lines connecting sub-pixels of each row are sequentially labeled as D-G1 . . . D-G2560 in FIG. 15.

In this way, when fingerprint identification is performed, the plurality of pixel units are driven to perform refreshing of display screen in the first time period t1 in the first display period T1, the fingerprint identification assembly is driven to perform fingerprint identification operation during the second time period t2 in the first display period T1. The time of the first display period T1 is greater than the second display period T2 (16.7 ms). In one embodiment, the time example of the first display period T1 can be extended to 100 ms to increase the time of fingerprint identification and improve the identification accuracy. The display frequency of the example is temporarily reduced to 10 Hz (10 Hz=1/100 ms), then T1=t1+t2=100 ms, thereby reducing the interference of the display signal on fingerprint identification.

Also, in order to reduce the influence on the display screen loading signal, the first time period t1 in the first display period T1 may be equal to the time of the second display period T2 (16.7 ms) when the fingerprint identification is not performed.

For example, after the first display of the gate refresh, the first scan of the first switching unit is performed. If the on-time of the first switching unit is 50 μs, the scanning time of 256 (256=2560/10) detection gate lines in a group is b1=12.8 ms (12.8 ms=50 μs*256). That is, the opening period b1 of the photosensitive units in one group is 12.8 ms.

After that, the photosensitive element starts to integrate the photocurrent, and performs scanning of the second switching unit for the second time to read out the image signal after the integration of the photocurrent. The time used is b2=70.5 ms (70.5 ms=100 ms-16.7 ms-12.8 ms). That is, the reading period of the photosensitive units in one group is b2=70.5 ms.

After that, the second display of the gate scan is performed, and the display of the second frame and the extraction of the fingerprint image signal are started. In the similar fashion, taking three point light sources as an example, three point light sources need to be sequentially inserted between the three frame display screens to illuminate, thereby completing the final fingerprint image collection work.

The above method of frequency reduction processing not only eliminates the interference of the display signal on the acquired fingerprint image signal after the photocurrent integration time is turned on, but also temporarily reduces the display refresh frequency to increase the photocurrent integration time of the photosensitive element. Thus, the signal amount of the acquired fingerprint image is increased, and the identification accuracy is further improved.

On the basis of the above, in one embodiment, a plurality of point light sources 11 arranged in an array in the display panel can be divided into S point light source groups, and S is a positive integer greater than 1. Each point light source group includes a plurality of point light sources. In each of the point light source groups, an effective light radiation area of each point light source covers an ineffective light radiation area of a point light source adjacent thereto.

In order to further accurately locate the opening position of the point light sources, the detection area may be further divided into w detection sub-areas, w is a positive integer greater than 1, and S=m*n*w. Each detection sub-area is provided with at least one point light source group.

The plurality of point light sources in the at least one detection sub-area overlapping the touch position are illuminated one by one in a manner of lighting one in a second time period, so that it can avoid mutual interference on the photosensitive unit when multiple point light sources are turned on at the same time.

Figure 16:
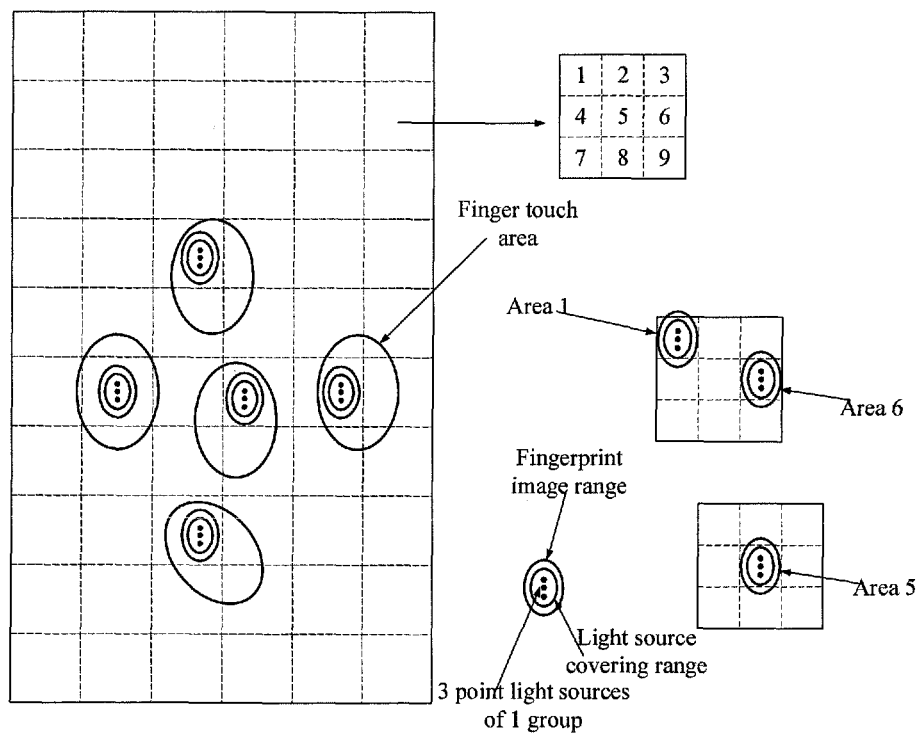
FIG. 16 is a schematic diagram of a principle of further partitioning a detection area in a fingerprint identification display module according to an embodiment of the present disclosure.

As shown in FIG. 16, by further dividing each detection area into a plurality of virtual detection sub-areas, taking the number of detection sub-areas W=9 as an example, the plurality of point light sources arranged in the array can be divided into 540 point light source groups. Each sub-area corresponds to a set of determined point light sources, each group having a total of three point light sources. After determining the touch position, one or more of the detection areas in which the touch location is located may be further analyzed to further determine which set of light sources to turn on to accurately locate the positions of the light sources to be opened.

In one embodiment, FIG. 16 above illustrates light source groups corresponding to a total of 3*3=9 detection sub-areas in each detection area under a 6*10 partition, the possible positional relationship between the finger pressing area and the detection area and the position of the light source group to be opened or illuminated.

For example, when it is determined that the detection sub-area corresponding to the vertical position of the touch position is the "area 1" marked in FIG. 16, three of the set of point light sources in the driving area 1 are turned on one by one in a manner of turning on one point light source in a second time period t2 (83.3 ms) within one first display period T1 (100 ms) so as to complete the scan of the fingerprint image three times.

When it is determined that the detection sub-area corresponding to the vertical position of the touch position is the "area 6" marked in FIG. 16, three of the set of point light sources in the driving area 6 are turned on one by one in a manner of turning on one point light source in a second time period t2 (83.3 ms) within one first display period T1 (100 ms), so as to complete the scan of the fingerprint image three times.

When it is determined that the detection sub-area corresponding to the vertical position of the touch position is the "area 5" marked in FIG. 16, three of the set of point light sources in the driving area 5 are turned on one by one in a manner of turning on one point light source in a second time period t2 (83.3 ms) within one first display period T1 (100 ms), so as to complete the scan of the fingerprint image three times.

It should be noted that, in a specific implementation, the implementation manner may be flexibly adjusted according to the number of partitions of the detection area, the further division number of the detection sub-areas in each detection area, and the positions of the light source groups. All of the parameters described above are reference values, and the present disclosure includes but is not limited thereto.

The above is only a specific embodiment of the present disclosure, but the scope of the present disclosure is not limited thereto, and any person skilled in the art can easily think of changes or substitutions within the technical scope of the present disclosure, and it should be covered by the scope of the present disclosure. Therefore, the scope of the disclosure should be determined by the scope of the appended claims.

REFERENCE MARK

01—display panel; 01A—display backplate; 10—fingerprint identification assembly; 11—point light source; 12—photosensitive unit; 121—photosensitive element; 122—first switch unit; 20—base substrate; 21—touch electrode layer; 22—cover glass; 23—pixel unit; 24—detection gate line; 25—data read line; 02—fingerprint identification display module; 03/03'—control module; 31—control IC; 32/32'—driving IC; 33—image processing/timing control/power management IC; 33'—image processing IC; 04—photosensitive unit control circuit; 41—first circuit; 42—second circuit; 41a—detection gate drive circuit; 41a1—shift register unit; 423—data selection unit; 423a—second switch unit; 421—selection gate line; 422—selection transmission line.

What is claimed is:

1. A fingerprint identification display module, comprising:
a display panel;
a fingerprint identification assembly in a display area of the display panel; the fingerprint identification assembly comprising a plurality of point light sources arranged in an array and a plurality of photosensitive units arranged in an array;
a plurality of pixel units; and
a control module;
wherein the plurality of point light sources are configured to emit signal light, and the plurality of photosensitive units are configured to receive the signal light reflected by a finger to identify a fingerprint of the finger;
the control module is configured to drive the plurality of pixel units to perform refreshing of a display screen during a first time period of a first display period, and drive the fingerprint identification assembly to perform fingerprint identification operation during a second time period of the first display period during a process of the fingerprint identification operation;
the control module is further configured to drive the plurality of pixel units to perform refreshing of a display screen during a second display period when the fingerprint identification operation is not performed; and
the second display period is smaller than the first display period.

2. The fingerprint identification display module of claim 1, wherein the plurality of point light sources are OLEDs, and the plurality of pixel units and the plurality of photosensitive units are arranged in a same layer on a base substrate of the OLED display panel.

3. The fingerprint identification display module of claim 1, wherein the plurality of point light sources are external light sources, the plurality of photosensitive units and the plurality of pixel units are arranged on a base substrate of the display panel, and the plurality of point light sources are arranged below the base substrate of the display panel.

4. The fingerprint identification display module of claim 3, wherein the plurality of point light sources are micro LED sources or mini LED sources.

5. The fingerprint identification display module of claim 4, wherein the plurality of pixel units and the plurality of photosensitive units are arranged alternately in a row direction and/or a column direction.

6. The fingerprint identification display module of claim 1, wherein the second display period is equal to the first time period of the first display period.

7. A fingerprint identification display module, comprising:
a display, panel;
a fingerprint identification assembly in a display area of the display panel; the fingerprint identification assembly comprising a plurality of point light sources arranged in an array and a plurality of photosensitive units arranged in an array;
a plurality of pixel units; and
a control module;
wherein the plurality of point light sources are configured to emit signal light, and the plurality of photosensitive units are configured to receive the signal light reflected by a finger to identify a fingerprint of the finger;
wherein the control module is configured to drive the plurality of pixel units to perform refreshing of a display screen during a first time period of a first display period, and drive the fingerprint identification assembly to perform fingerprint identification operation during a second time period of the first display period during a process of the fingerprint identification operation;

the display area comprises a plurality of detection areas;
the plurality of the point light sources and the plurality of the photosensitive units being disposed in each of the detection areas;
the display panel further comprises a touch electrode layer in the display area;
the control module comprises a control IC, an image processing IC, and a driving IC,
wherein the control IC is configured to determine a touch position based on the touch electrode layer;
the image processing IC is configured to determine at least one of the detection areas overlapping the touch position according to the touch position; and
the driving IC is configured to drive the point light sources in the at least one of the detection areas overlapping the touch position to illuminate and drive the photosensitive units in the at least one of the detection areas overlapping the touch position to receive the signal light reflected by the finger.

8. The fingerprint identification display module of claim 7, wherein the control module is further configured to drive the plurality of pixel units to perform refreshing of a display screen during a second display period when the fingerprint identification operation is not performed; and
the second display period is smaller than the first display period.

9. The fingerprint identification display module of claim 8, wherein the second display period is equal to the first time period of the first display period.

10. The fingerprint identification display module of claim 7, further comprising a photosensitive unit control circuit;
wherein the photosensitive unit control circuit is configured to, under a control of the control module, turn on the photosensitive units in the at least one of the detection areas overlapping the touch position to identify the fingerprint at the touch position.

11. The fingerprint identification display module of claim 10, wherein each of the photosensitive units comprises a photosensitive element configured to receive the signal light reflected by the finger to generate a photocurrent and a first switch unit configured to control an output of the photocurrent generated by the photosensitive element; and
the photosensitive unit control circuit comprises a first circuit and a second circuit;
the first circuit is connected to control terminals of a plurality of first switch units, and is configured to turn on the first switch units in the at least one of the detection areas overlapping the touch position under the control of the control module, and
the second circuit is connected to output terminals of the plurality of first switch units, and is configured to read the photocurrent outputted by the output terminals of the first switch units in the at least one of the detection areas overlapping the touch position under the control of the control module.

12. The fingerprint identification display module of claim 11, wherein the display panel further comprising:
X detection gate lines connecting to the control terminals of each row of the first switch units; and
Y data read lines connecting to the output terminals of each column of the first switch units;
wherein, the X detection gate lines are divided into in groups, and the Y data read lines are divided into n groups, the number of the detection areas is m*n, and each detection area corresponding to X/m detection gate lines and Y/n data read lines arranged in sequence;
wherein X, Y, m, and n are all positive integers greater than 1, and X>m, Y>n.

13. The fingerprint identification display module according to claim 12, wherein:
the first circuit comprises in detection gate driving circuits corresponding to the in groups one by one, each of the in detection gate driving circuits is configured to control a plurality of the first switch units in one group to turn on line by line;
the second circuit comprises n selection gate lines, Y/n selection transmission lines, and n data selection units corresponding to the n groups one by one; each of the data selection units comprising Y/n second switch units that are in one-to-one correspondence with Y/n data read lines in each group;
wherein input terminals of the second switch units are respectively connected to the data read lines, control terminals of the Y/n second switch units in a same data selection unit are all connected to a same selection gate line; and an output terminal of the i-th second switch unit in each of the data selection units is connected to a same selection transmission line, wherein i is an integer from 1 to Y/n.

14. The fingerprint identification display module of claim 13, wherein the driving IC is configured to output a control terminal start signal to the detection gate driving circuit, and an input terminal of each of the detection gate driving circuit for receiving the control terminal start signal is independently connected to each gate driving pin of the driving IC;
the driving IC is further configured to output a selection start signal to the n selection gate lines;
the driving IC is further configured to read the photocurrent transmitted by the selection transmission lines, and each of the selection transmission lines is independently connected to each source driving pin of the driving IC; and
the image processing IC is further configured to acquire a fingerprint image based on the photocurrent output by the driving IC.

15. A fingerprint identification method of a fingerprint identification display module, comprising:
determining a touch position of a finger touched on a display panel,
determining at least one of detection areas of the display panel overlapping the touch position according to the touch position; and
turning on point light sources and photosensitive units in a fingerprint identification assembly in the at least one of die detection areas overlapping the touch position to identify a fingerprint of the finger;
wherein turning on the photosensitive units in the at least one of the detection areas overlapping the touch position to identify the fingerprint of the finger comprises:
opening, a plurality of first switch units in the at least one of the detection areas overlapping the touch position; and
reading photocurrent outputted by output terminals of the plurality of first switch units in the at least one of the detection areas overlapping the touch position.

16. The fingerprint identification method of claim 15, wherein opening the plurality of the first switch units in the at least one of the detection areas overlapping the touch position comprises:
outputting a control terminal start signal to a detection gate driving circuit corresponding to the at least one of the detection areas overlapping the touch position, so that to open the plurality of the first switch units in at least one of the detection areas overlapping the touch position.

17. The fingerprint identification method of claim 15, wherein reading the photocurrent output by the output terminals of the plurality of first switch units in the at least one of the detection areas overlapping the touch position, comprises:

outputting a selection start signal to at least one of selection gate lines, wherein the selection gate lines are connected to control terminals of the second switch units, and the input terminals of the second switch units are connected to the data read lines corresponding to the at least one of the detection areas overlapping the touch position; and reading photocurrent transmitted by the selection transmission lines connected to output terminals of the corresponding second switch units.

18. The fingerprint identification method of claim 15, wherein, when performing fingerprint identification operation, the plurality of pixel units is driven to perform refreshing of a display screen during a first time period of a first display period, and the fingerprint identification assembly is driven to perform the fingerprint identification operation during a second time period of the first display period.

19. The fingerprint identification method of claim 18, wherein, when the fingerprint identification operation is not performed, the plurality of pixel units is driven to perform refreshing of a display screen during a second display period; and the second display period is less than the first display period.

* * * * *